United States Patent
Bendeck et al.

(10) Patent No.: US 10,134,245 B1
(45) Date of Patent: Nov. 20, 2018

(54) SYSTEM, METHOD, AND APPARATUS FOR MONITORING AUDIO AND VIBRATIONAL EXPOSURE OF USERS AND ALERTING USERS TO EXCESSIVE EXPOSURE

(71) Applicant: Tractouch Mobile Partners, LLC, Miami, FL (US)

(72) Inventors: Mauricio Bendeck, Miami, FL (US); Jaime Andreas Borras, Miramar, FL (US); Alain Edwards, Pembroke Pines, FL (US)

(*) Notice: Subject to any disclaimer, the term of this patent is extended or adjusted under 35 U.S.C. 154(b) by 0 days.

(21) Appl. No.: 15/810,079

(22) Filed: Nov. 12, 2017

Related U.S. Application Data (62) Division of application No. 15/136,376, filed on Apr. 22, 2016, now Pat. No. 9,818,270.

(60) Provisional application No. 62/150,915, filed on Apr. 22, 2015, provisional application No. 62/150,918, filed on Apr. 22, 2015, provisional application No. 62/150,925, filed on Apr. 22, 2015.

(51) Int. Cl.
| | |
|---|---|
| H04R 29/00 | (2006.01) |
| G08B 6/00 | (2006.01) |
| H04L 29/06 | (2006.01) |
| G08B 21/02 | (2006.01) |
| H04M 1/60 | (2006.01) |
| H04M 1/725 | (2006.01) |

(52) U.S. Cl.
CPC ............... *G08B 6/00* (2013.01); *G08B 21/02* (2013.01); *H04L 63/0428* (2013.01); *H04L 63/08* (2013.01); *H04L 63/10* (2013.01); *H04M 1/6016* (2013.01); *H04M 1/72569* (2013.01); *H04R 29/00* (2013.01)

(58) Field of Classification Search
CPC ...................................................... H04R 29/00
See application file for complete search history.

(56) References Cited

U.S. PATENT DOCUMENTS

| | | | | |
|---|---|---|---|---|
| 2010/0158275 | A1* | 6/2010 | Zhang | H03G 3/32 381/107 |
| 2010/0202622 | A1* | 8/2010 | Hardee | H04M 19/044 381/57 |
| 2010/0329471 | A1* | 12/2010 | Dunn | H03G 3/32 381/57 |
| 2012/0201393 | A1* | 8/2012 | Cheek | H03G 3/32 381/57 |
| 2012/0259441 | A1* | 10/2012 | Armstrong | H03G 3/10 700/94 |

(Continued)

*Primary Examiner* — Olisa Anwah
(74) *Attorney, Agent, or Firm* — Scott M. Garrett (57) ABSTRACT

A system, method, and apparatus for monitoring ambient sound and vibration levels at the location of a user allows a determination as to whether the user is exceeding a maximum allowed exposure time as determined by an occupational standard. The sound and vibration level data can be evaluated locally at the mobile communication device, as well as transmitted to a backend system to allow supervision of personnel associated with the backend system as a further assurance that personnel comply with exposure limits. Further, the mobile communication device, in response to ambient conditions, adjusts the settings of its alerting sound and the vibration level of an associated vibration accessory to ensure perception of alerts by the mobile communication device for the user of the mobile communication device.

6 Claims, 5 Drawing Sheets

(56) References Cited

U.S. PATENT DOCUMENTS

| | | | |
|---|---|---|---|
| 2012/0306823 A1* | 12/2012 | Pance | H04R 1/028 345/177 |
| 2013/0078976 A1* | 3/2013 | Naftolin | H04M 1/72569 455/418 |
| 2013/0094656 A1* | 4/2013 | Fung | H03G 3/3005 381/57 |
| 2013/0326583 A1* | 12/2013 | Freihold | G06F 3/04815 726/3 |
| 2014/0329567 A1* | 11/2014 | Chan | H04M 1/605 455/569.2 |
| 2016/0056781 A1* | 2/2016 | Rose | H03G 3/02 381/107 |
| 2016/0149547 A1* | 5/2016 | Rider | H03G 3/04 381/57 |
| 2016/0284198 A1* | 9/2016 | Tarn | A61M 1/14 |

* cited by examiner

SYSTEM, METHOD, AND APPARATUS FOR MONITORING AUDIO AND VIBRATIONAL EXPOSURE OF USERS AND ALERTING USERS TO EXCESSIVE EXPOSURE

CROSS REFERENCE

This application is a divisional application of non-provisional application Ser. No. 15/136,376, filed Apr. 22, 2016, and titled "System, Method, and Apparatus for Monitoring Audio and Vibrational Exposure of Users and Alerting Users to Excessive Exposure," the entirety of which is hereby incorporated by reference. As a divisional application of non-provisional application Ser. No. 15/136,376 this application further claims the benefit of: provisional application No. 62/150,915 filed Apr. 22, 2015, titled "System, Method, and Apparatus for Monitoring Audio and Vibrational Exposure of Users and Alerting Users to Excessive Exposure," the entirety of which is hereby incorporated by reference; provisional application No. 62/150,918 filed Apr. 22, 2015, titled "Smart Cylindrical Vibration Accessory," the entirety of which is hereby incorporated by reference; and provisional application No. 62/150,925 filed Apr. 22, 2016, titled "Waveform Security Authentication," the entirety of which is hereby incorporated by reference.

FIELD OF THE DISCLOSURE

The present disclosure relates generally to monitoring ambient conditions in which one or more persons are located, and more particularly to monitoring and alerting people when they have reached or exceeded audio and/or vibrational exposure limits as determined by occupational safety organizations.

BACKGROUND

Mobile communication devices alert users when a message has been received, or is being received. Messages are received at the mobile communication device wirelessly, using a wireless communication protocol, from a communication infrastructure, such as a cellular telephony network. The alert can be provided visually, audibly, by tactile means (e.g. vibration), or by a combination of those alert modalities. Visual alerts, however, require that the user look at the device, which, in many cases, may only occur, if at all, long after a message is received at the mobile communication device. Audible alerts are common, and typically involve the mobile communication device playing a preselected audio sound over a speaker component. However, in noisy environments, an audible alert may not be heard by the user. Tactile alerts are often used when an audible alert would be disruptive to nearby persons, so it would be desirable to keep alerts quiet. However, a typical vibration system in conventional communication devices is relatively weak, and if the mobile communication device is carried in heavy clothing, in noisy environments, or in environments that produce vibrations, an alert using a conventional mobile communication device vibration system may not produce a vibration that will be detected by the user.

Another problem of noisy environments with considerable ambient vibration is that the noise and vibration can have negative health consequences. Various occupational safety agencies of governments have specified, for example, safe levels of exposure (over time) to various sound levels, and other ambient conditions for workplaces. However, personnel in such conditions typically are not measuring sound and/or vibration levels, and are therefore not likely to be able to judge their own exposure. Furthermore, as overexposure can be an occupational issue, employers have an interest in facilitating employee conformance to occupational standards since it results in fewer injuries, and more favorable working conditions in general.

Accordingly, there is a need for a method and apparatus for monitoring a person's exposure to high levels of sound and vibration, alerting people when their exposure level has exceeded an occupational standard, and adjusting the alert means used by a mobile communication device associated with a given person so as to increase the likelihood that the person will perceive an alert upon receiving a message notifying the person of the excessive exposure.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments include system, method, and apparatus embodiments that relate to the local measurement of sound and vibration levels at the location of a mobile communication device, and in particular the location of a user of the mobile communication device. These measurements are used for at least two purposes; to adjust the sound and vibration output of audio and vibration systems controlled by the mobile communication device to ensure alerts will be perceived by the user of the mobile communication device, and to determine exposure time to high sound and vibration levels in order to alert the user, and to alert other personnel associated with the user so as to assure compliance with remediation procedures and avoid further exposure.

Embodiments include a method of alerting a user of a mobile communication device that includes receiving, at the mobile communication device, a message, and measuring a first audio level of ambient sound at a location of the mobile device. The method can further include determining whether the first audio level of ambient sound is higher than a present speaker volume setting of a speaker controlled by the mobile device for outputting audio to be heard by a user of the mobile device. When the first audio level of ambient sound exceeds the present speaker volume setting by a preselected threshold, the mobile device increases the speaker volume setting by a preselected amount. The method can further include determining whether speaker volume setting is at a maximum, and when the speaker volume setting is at the maximum, enabling a vibration of a vibration system controlled by the mobile device to vibrate. Also enabling a high pitch alert tone like 2.2 KHz.

Some embodiments include a method of alerting a user of a mobile communication device that includes receiving, at the mobile communication device, a message, and measuring a first ambient vibration level at the location of the mobile communication device. The method can further include determining whether the first ambient vibration level is higher than a present vibration setting of a vibration system controlled by the mobile communication device for tactile alert of a user of the mobile communication device, and when the first ambient vibration level exceeds the present vibration setting by a preselected threshold, the mobile device increasing the vibration setting by a preselected amount. The method can further include determining whether vibration setting is at a maximum, and when the vibration setting is at the maximum, playing a maximum vibration sequence at the vibration system and playing an audio alert tone.

Some embodiments can include a method of determining audio exposure compliance of a user having a mobile communication device that includes measuring, by the mobile device at intervals, an audio level of ambient sound at a location of the mobile device. The method can further include comparing each measured audio level to a plurality of audio exposure thresholds, and alerting when the audio level exceeds any of the plurality of audio exposure thresholds. The method can further include determining a period of time that the audio level has exceeded one or more of the plurality of audio exposure threshold, and when the period of time exceeds an allowed exposure time for any of the plurality of audio exposure levels, the mobile communication device reporting an excessing exposure event to a backend exposure monitoring system with which the mobile communication device is associated.

Some embodiments can include a backend monitoring system for monitoring the audio and vibrational exposure of a plurality of users that includes a backend server that issues exposure request messages and receives exposure measurements. The requests are issued to mobile communication devices associated with the backend server. Thus, the system can further include a plurality of mobile communication devices, each of which is uniquely associated with the backend server and a particular user. The backend server issues the exposure request messages to each of the plurality of mobile communication devices and receives respective exposure measurement from each of the plurality of mobile communication devices. The server stores the exposure measurements in records associated with each mobile communication device. When the exposure measurement for any mobile communication device indicates an excessive exposure, the backend server issues an exposure alert message to the respective mobile communication device.

Figure 1:
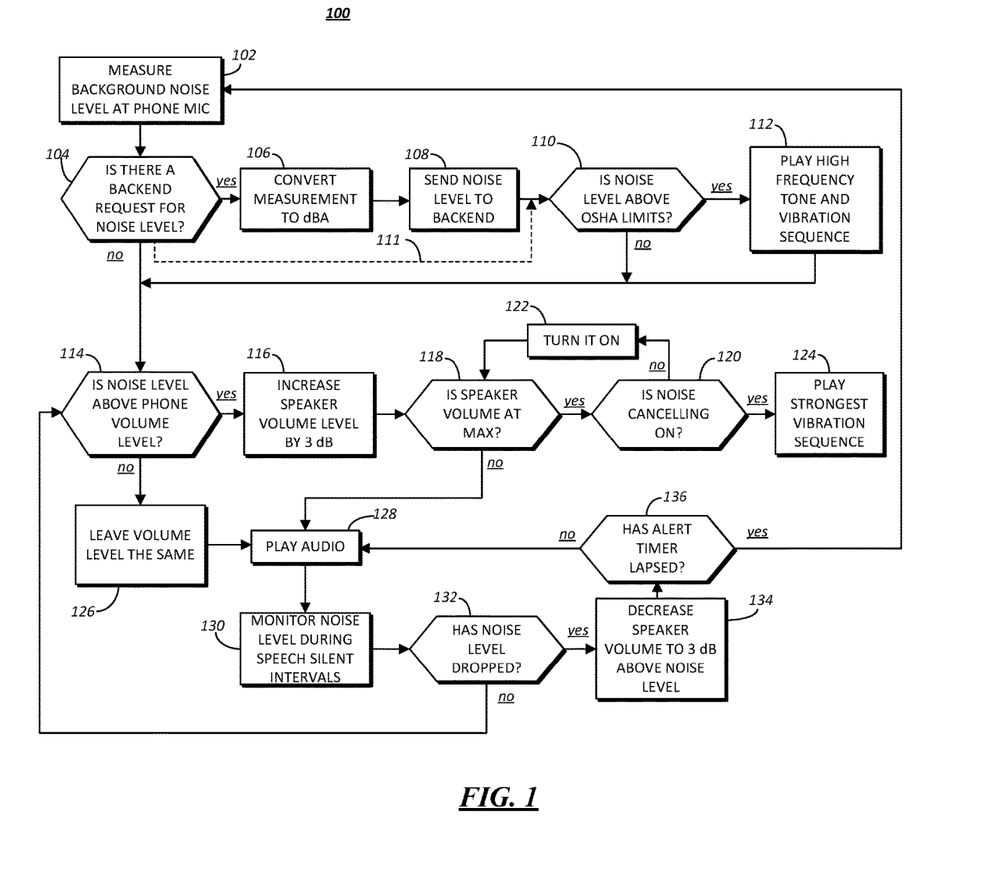
FIG. 1 is a flow chart diagram of a method for monitoring an ambient sound level at a mobile communication device, in accordance with some embodiments.

FIG. 1 is a flow chart diagram of a method 100 of measuring ambient sound level at a mobile communication device and determining whether the ambient sound level is at an elevated level, sufficiently high to be of concern for health and safety, and if so to report the exposure of the user of the mobile communication device to a backend system, as well as to alert the user of an exposure limit being reached. At the start 102, the mobile communication device and associated peripheral devices are powered on and operating normally. The peripheral devices include a vibration accessory that communicates with the mobile communication device over a short range or "personal area network" wireless link such as those described by specifications 802.11 and 802.15 of the Institute for Electrical and Electronic Engineers (IEEE). In step 102 the mobile communication device first measures the ambient sound level using, for example, a microphone of the mobile communication device. The microphone can be the microphone used for telephone voice communication or it can be a separate microphone specially adapted to measure ambient sound and noise. In step 104 the mobile communication device can determine if it has received a request from the associated backend system to report the present ambient sound level. The backend system supports a service to which the user of the mobile device subscribes, and includes a network-accessible server with which a client application installed on the mobile communication device interacts. If in step 104 a backend request for a noise level measurement or sample has been received, then the method 100 proceeds to step 106 where the most recent ambient sound level measurement as produced in step 102 can be converted into decibels as weighted by the "A" filter (dBA) which represents a weighting based on human audio perception. The "A" filter is a weighting curve used to weight sound pressure levels as a function of frequency, approximately in accordance with the frequency response characteristics of the human auditory system for pure tones. This means that energy at low and high frequencies is de-emphasized in relation to energy in the mid-frequency range. The measurement in dBA can be sent to the requesting backend system in step 108 over a wireless network medium (e.g. cellular data network, WiFi, or other suitable network). In step 110 the method 100 determines whether the present sound level exceed any occupational limit. If yes, then the mobile communication device issues an alert in step 112 by playing a high frequency (e.g. 2.2 KHz) tone, and it can also cause the vibration accessory or system to vibrate at a maximum vibration to alert the user of the exposure, as well as flash the display of the mobile communication device (i.e. alternating white and black, or some other patterns and colors that are dynamically changed).

If in step 104 or 110, if the determination is negative, the method 100 can proceed to step 114 where the mobile communication device determines if the ambient sound level is above the present audio volume setting used by the mobile communication device to output sound via a speaker of the mobile communication device. In some embodiments, at step 104, where there isn't a pending request from the backend system, the method 100 can proceed directly to step 110, as indicated by line 111, in which case the method 100 would not automatically proceed from step 104 to 106, 108.

The audio volume setting can be controlled in discrete steps that correspond to decibels. If the present ambient audio level around the mobile communication device, as measured in step 102, is above a present audio volume setting of the mobile communication device, then in step 116 the audio volume setting can be increased by, for example, 3 dB. In step 118 if the new resulting audio volume setting is then at the maximum setting, then in step 120 the method 100 can determine whether a noise cancelling function is enabled. The noise cancelling function can be applied to audio output by the speaker, including both alert audio output signals and voice audio received, for example, in voice communication. The noise cancelling can attempt to reduce the level of the sound reaching the users ear during a conversation by cancelling out ambient noise. Noise cancelling operates by sampling ambient noise, such as by a microphone which can be the same microphone used in step 102, and dynamically generating an anti-noise signal to be mixed in with an audio signal to be played over the speaker. If the noise cancelling function is presently enabled in step 120, then the method proceeds to step 124 and plays a vibration sequence via the associated vibration system (i.e. the vibration accessory). The vibration sequence can be a special vibration sequence selected to ensure tactile perception by the user, and it can override a user-selected vibration pattern. After performing step 124 the method 100 can return to step 102 for another iteration of the method 100.

In step 114, if the determination is negative, the method can proceed to step 126 where the audio volume setting is left alone, and proceed to step 128 where the audio is played over the speaker. The audio to be played here can be an alert or received voice communication, if any. Likewise, if the determination in step 118 is negative, then the method proceeds to step 128 to commence playing audio (if there is any to be played). In step 130, while playing audio, the mobile communication device can monitor the ambient sound level during silence periods of the user's voice communication at the microphone of the mobile communication device. It is common for mobile communication devices to have sophisticated voice processing capability to determine characteristics of a user's speech, including detecting silence periods. In step 132 the mobile communication device determines whether the ambient sound level has dropped sufficiently. If yes, then in step 134 the audio volume setting for the speaker can be lowered while the audio continues to be played over the speaker, and then proceed to step 136. In step 136 an alert timer can be checked to determine if an alert duration has passed, and if not then the method 100 returns to step 128. If, in step 136 the alert time has not lapsed the method 100 can return to step 102. If in step 132 the ambient sound level has not dropped, then the method returns to step 114 and reiterates a portion of the method 100.

Method 100, although shown here as a process flow, can also represent a state flow. In a state flow model the steps represent processes that can be undertaken either at specified times, or responsive to predicate processes being performed. For example, step 102 can be a process that is performed once every several seconds without regard to any other process, simply as a background process performed at regular intervals. Step 104 can be a process that operates in response to receiving a request from a backend system, independent of process 102, wherein process 104 responsively triggers processes 106, 108 to be performed. Likewise, processes 110, 114 can be performed either in response to process 102 being performed, or at selected time periods using the most recent measurement produced by process 102. Furthermore, step 128 represents a process that can occur at any time upon receiving, for example, a message or voice call, and the audio will be played at whatever settings are dictated by the current state of the mobile communication device when the message or call is received.

Figure 2:
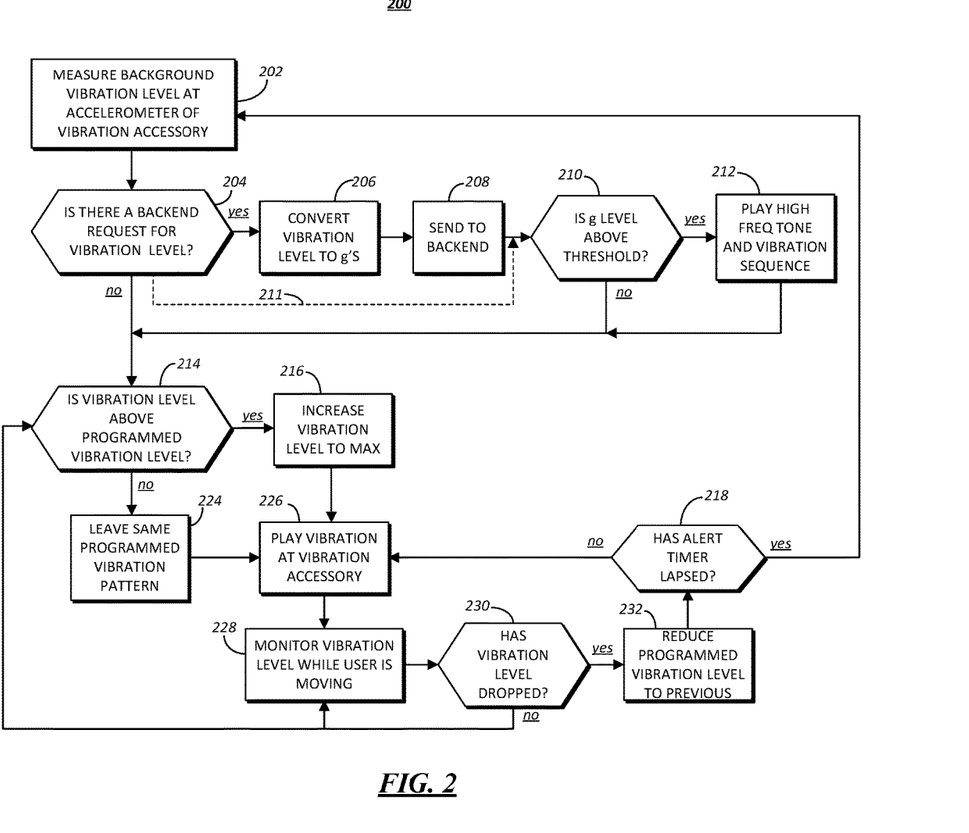
FIG. 2 is a flow chart diagram of a method for monitoring an ambient vibration level at a mobile communication device, in accordance with some embodiments.

FIG. 2 shows a flow chart diagram of a method 200 of measuring ambient vibration level at a mobile communication device and determining whether the ambient vibration level is at an elevated level of concern, and if so to report the exposure of the user of the mobile communication device to a backend system, as well as to alert the user of an exposure limit being reached. The method involved both the mobile communication device and an associated vibration accessory. As with method 100 of FIG. 1 those skilled in the art will appreciate that method 200, although discussed here as a flow of steps, can be implemented as a collection of processes that can be invoked independently, or dependently in response to other processes being performed, to change a state of the mobile communication device and the associated vibration accessory.

Accordingly, the method can start in step 202 by measuring an ambient vibration at the location of the mobile communication device and the vibration accessory via, for example, an accelerometer. The accelerometer can be disposed in the vibration accessory that is associated with the mobile communication device and worn or carried by the user of the mobile communication device. The vibration accessory is an independent device that includes an accelerometer and a vibration system, as well as a communication circuit to communicate with the mobile communication device to be operated under control of an application program running on the mobile communication device via communication link established between the vibration accessory and the mobile communication device. The accelerometer can be an array of micro electro-mechanical switches including a plurality of such switches that each switch at a different acceleration level to indicate an acceleration being experienced by the accelerometer. The application running on the mobile communication device can control the vibration accessory to sense the present vibration using its accelerometer, and then transmit the result to the mobile communication device for further consideration in method 200.

In step 204 the mobile communication device can determine whether there is a query or request pending from the backend system or server, requesting a present vibration level measurement. If there is such a request, then the method proceeds to step 206 where the mobile communication device can convert the raw data to normalized gravity ("g") units. In step 208, the mobile communication device can send the measured vibration level in "g" units to the backend or other requesting entity. In step 210, the method 200 can determine whether the measured vibration level is above a maximum limit, or whether the vibration pattern correlates to a known vibration pattern that represents a potential danger or a hazardous pattern that could cause physical effects (i.e. dizziness, nausea) and if so, then in step 212 the mobile communication device can play a high frequency (e.g. 2.2 KHz) and a special vibration sequence to alert the user as to the maximum limit being exceeded. In some embodiments the method 204 can automatically proceed from step 204 to step 210, skipping steps 206, 208, as indicated by dashed line 211.

If the determinations of steps 204 or 210 are negative, or after performing step 212, the method proceeds to step 214 where the measured present ambient vibration level is compared to a programmed vibration level setting of the vibration accessory, which is the vibration magnitude at which the vibration accessory will vibrate upon command from the mobile communication device. The programmed vibration level is a setting selected by, for example, the user of the mobile communication device and associated vibration system. The setting can indicate a pattern and amplitude scale. A vibration pattern can change amplitude, frequency, or both, over a vibration interval during which the pattern is played by controlling a vibration motor according to the vibration pattern. If in step 214 it is found that the present ambient vibration level, as measured in step 202, is above the programmed level, then in step 216 the mobile communication device can increase or scale up the vibration level setting by an increment, or advance it to a maximum level. Upon increasing the vibration setting in step 216, and the method 200 can proceed to step 226 where the vibration pattern is played by the vibration accessory at a maximum level.

If in step 214 the determination is negative, then in step 224 the vibration setting is left alone, and in step 226 a vibration sequence selected by the user (or a default sequence) can be played to alert the user to incoming messages, upon a message being received at the mobile communication device. The method 200 can then proceed to steps 228, 230, and 232 to determine whether the ambient vibration level has dropped to adjust the vibration setting level. In step 228 the ambient vibration is monitored (periodically or occasionally measured), and in step 230 a present ambient vibration level can be compared to the vibration setting to determine whether to reduce the vibration setting level in step 232. If not, then the method 200 proceeds from step 230 back to step 214. After step 232 the method can proceed to step 218 to determine whether an alert duration has elapsed. If not, then the method 200 returns to step 226, and if so, then the method 200 returns to step 202. The alert duration is a maximum duration selected for an alert to continue after it is first commenced.

Figure 3:
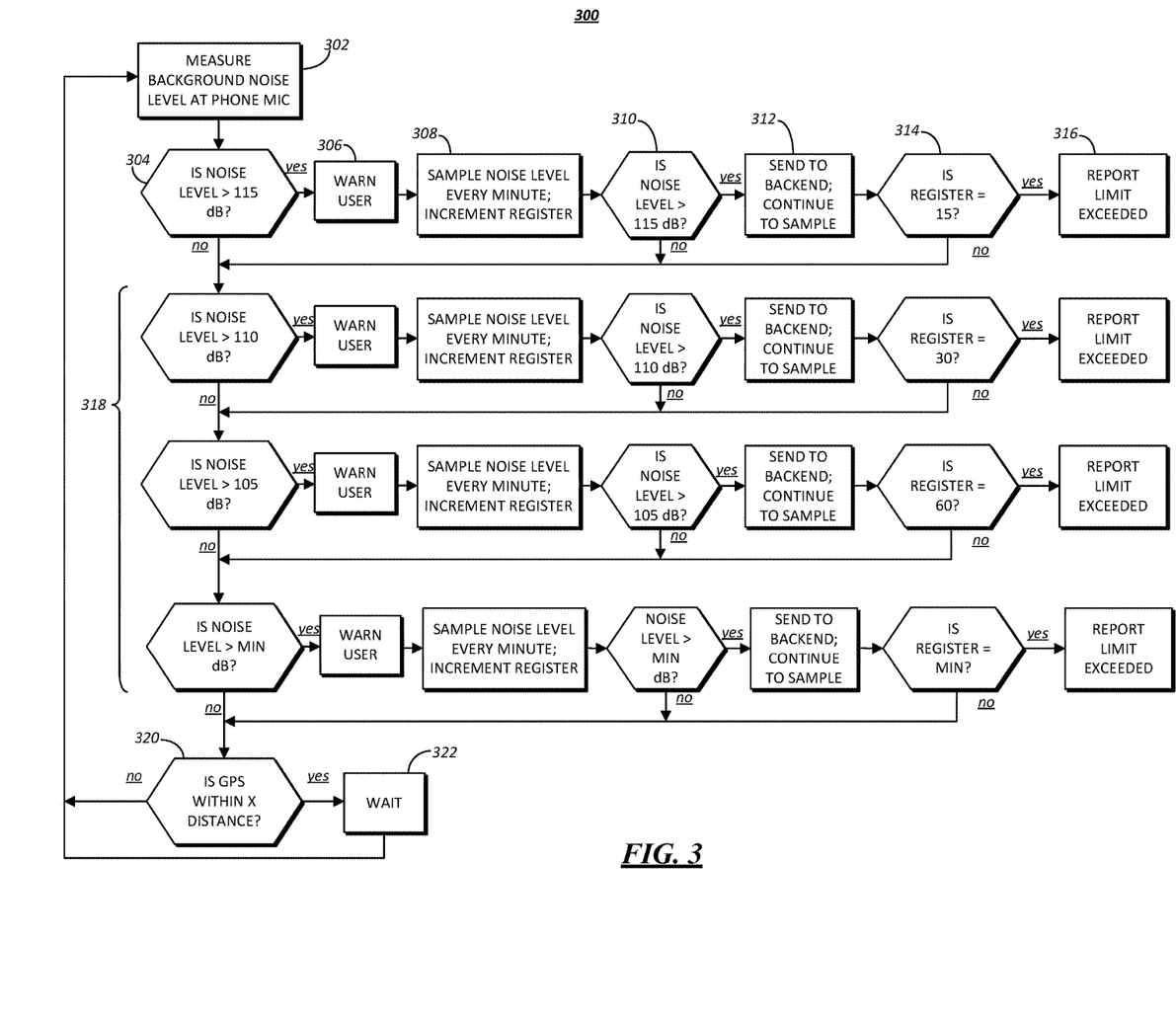
FIG. 3 is a flow chart diagram of a method for evaluation of ambient sound levels with threshold levels for exposure time compliance, in accordance with some embodiments.

FIG. 3 is a flow chart diagram of a method 300 for ensuring sound pressure level compliance with an occupational safety standard, in accordance with some embodiments. The method 300 can be performed by a mobile communication device, or in conjunction with a backend system, in some embodiments. The method 300 allows a backend system to track a user's exposure to high level sound pressure levels to allow, among other things, management of organization personnel to ensure compliance with occupational standards.

Accordingly, in step 302, the mobile communication device can measure the ambient sound pressure level being produced by noise and other sounds in the vicinity of the mobile communication device using a microphone or other acoustic sensor of the mobile communication device. The method is iterative and includes several main steps which are repeated for successively lower sound pressure level thresholds. In step 304 the measured sound pressure level of step 302 is compared to a first sound pressure level threshold. If the measured sound pressure level is above the threshold used in step 304, then in step 306 a warning is issued to the user by the mobile communication device, or by the vibration accessory under control of the mobile communication device, as an alert. The method of playing alerts can be controlled, for example, by the method 100 of FIG. 1. In step 308 the method 300 can sample the ambient sound pressure level again after a preselected time period and increment a timer or counter register used to keep track of exposure duration. In step 310 a determination is made as to whether the second sample of ambient sound pressure level at the mobile communication device of step 308 is greater or lower than the threshold used in step 304. If the second sample is greater than the threshold used in step 304, then the method proceeds to step 312 where the value of the ambient sound pressure level can be sent to a backend monitoring server with which the mobile communication device is associated (i.e. subscribed to a service). In step 314 the time duration for which the ambient sound pressure level has exceeded the threshold of step 304 is determined, as indicated by the duration register (e.g. the one incremented in step 308), and if it is greater than a maximum exposure time corresponding to the threshold used in step 304, then in step 316 a report is made to the backend server that the user has exceeded the maximum exposure time. Alternatively, the backend server can perform steps 314, 316. The report can trigger an alert message to the mobile communication device, as well as to a supervisor and other personnel (e.g. personnel known to be physically near the user of the mobile communication device). The method of steps 304, 306, 310, 312, 314, and 316 can be repeated in iterations for different threshold, as indicated by bracket 318. As the sound pressure level threshold is decreased, generally, the exposure time limit increases. The method 300 can therefore iterate until a lowest (minimum "MIN") threshold is tested by a branch of processing similar to steps 304-316. In step 320 the method 300 can determine whether the location of the mobile communication device has changed, such as by comparing a present location, as indicated by a Global Positioning Satellite (GPS) receiver system of the mobile device, is sufficiently different from a prior location. If the present location has not sufficiently changed, then in step 322 a delay occurs before proceeding back to step 302 in order to save battery energy. During the delay the register duration maintained by step 308 may be incremented again. Otherwise, if in step 320 the mobile communication device's position has changed sufficiently, the method 300 can directly proceed to step 302 without delay.

Figure 4:
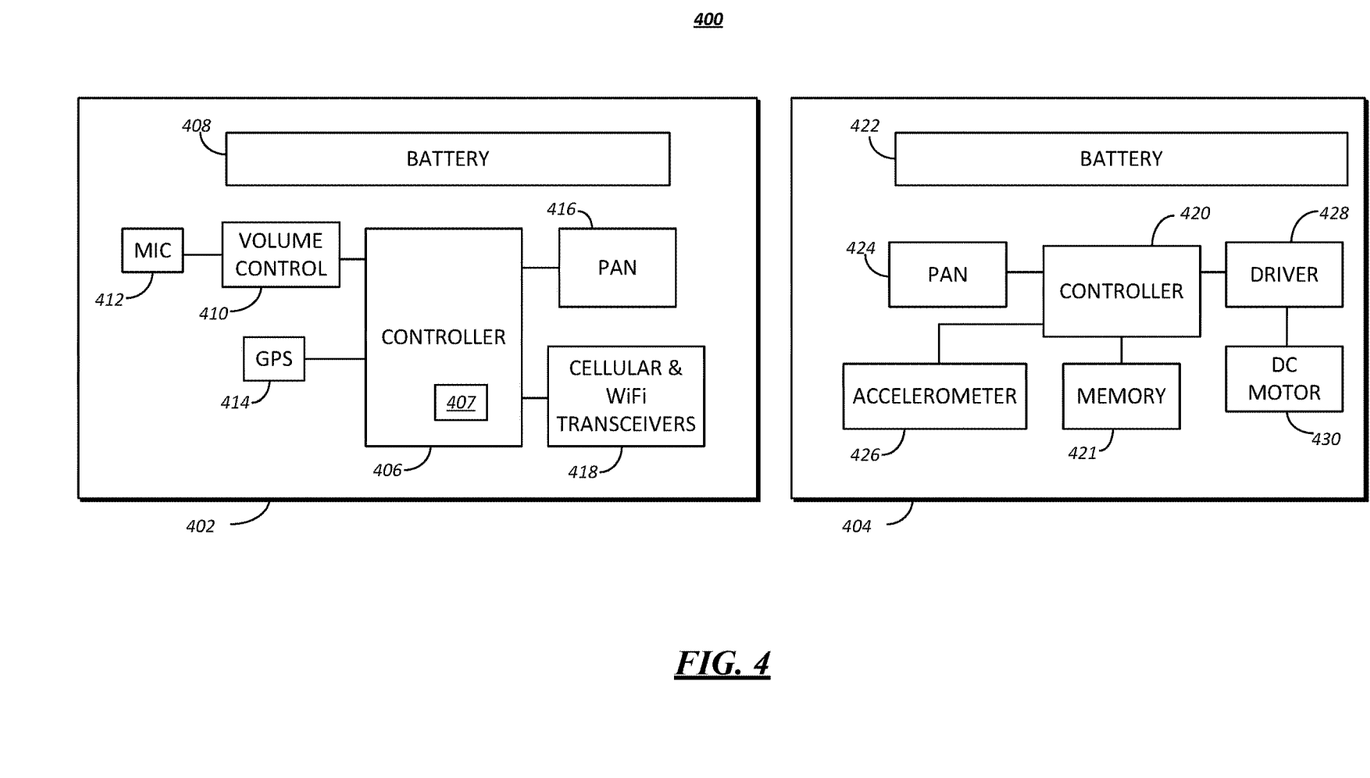
FIG. 4 is a block schematic diagram of a mobile communication device and an associated vibration accessory, in accordance with some embodiments.

FIG. 4 shows a block diagram 400 of a mobile communication device 402 and a vibration accessory 404. The mobile communication device 402 can be, for example, a "smart" cellular telephone device that is capable of loading program code (i.e. an "app" or application) that can be executed by a processor or microcontroller 406 and associated memory (not shown). The processor executes an application program 407 that allows the mobile communication device 402 to communicate with, and control, the vibration accessory 404, as well as to communicate with a backed system using radio resources of the mobile communication device 402. The mobile communication device 402 is powered by a battery 408 that provides power to the various circuits and components of the mobile communication device 402. To measure sound pressure level a microphone 412 can be used. The microphone is an acoustic transducer that creates an electrical signal corresponding to acoustic waves that are incident on the microphone. A volume control 410 can be used to adjust the gain of the microphone 412 and provide a signal to the controller 406 which can in turn store and/or process the signal. To allow the mobile communication device 402 to determine its location, a positioning system such as a Global Positioning Satellite (GPS) receiver 414 can be used to receive GPS signals from GPS satellites and provide location information to the controller 406. The GPS receiver 414 location output, in combination with the ambient noise/vibration measurement, once uploaded to the backend, serves as a basis to contact other workers and inform them to avoid the high noise/vibration vicinity according to the business rules, and therefore avoiding potential injuries or unhealthy exposure. To perform communications activity, the mobile communication device 402 can include one or more radio transceivers such as, for example, a cellular transceiver and a wireless local area network receiver or personal area network (PAN) transceiver (included together in box 418, but operated separately as is known in the art). A PAN transceiver 416 (e.g. a Blue Tooth transceiver) can be used for connecting to nearby devices, such as the vibration accessory 404.

The vibration accessory 404 is used to augment the ability of the mobile communication device 402 to alert the user of the mobile communication device 402 under noisy or loud conditions, as well as in conditions when a conventional vibrator of the mobile communication device 402 (not shown) would be insufficient to produce vibrations that could be sensed by the user of the mobile communication device 402 due to ambient vibration or heavy clothing worn by the user. It includes a controller 420 such as a microprocessor to execute code which can be stored or instantiated in memory 421, and a battery 422 for powering the vibration accessory 404. A PAN transceiver 424 allows the vibration accessory 404 to link with the mobile communication device 402 via the PAN transceiver 416 of the mobile communication device 402. An accelerometer 426 can be used to sense acceleration experienced by the vibration accessory due to external vibration sources (e.g. work equipment, vehicles, etc.) to determine an ambient vibration magnitude being experienced by the vibration accessory, and implicitly by the user of the mobile communication device 402 and vibration accessory 404. Vibration measurement values or data can be provided to the controller 420, and then transmitted to the mobile communication device 402 via PAN transceivers 424, 416.

To play a vibration sequence, such as for an alert, a driver circuit 428 is coupled to a vibration motor 430. The vibration motor 430 typically drives a shaft on which an eccentric cam is mounted such that when the shaft is turned by the motor 430, the off-center eccentric cam will produce vibration, as is known. The driver circuit 428 can be responsive to the controller 420 to adjust the speed (rotational frequency) at which the motor is turned, thereby adjusting magnitude of the vibrations. Speeds near the natural resonant frequency of the system will produce the largest vibrations. The controller 420 can use stored vibration sequences that can be selected by a user, even transmitted to the vibration accessory 404 by the mobile communication device 402. Upon an alert being required, the mobile communication device 402 transmits a command to the vibration accessory 404. The command may indicate a magnitude and/or a vibration sequence to be used. Commands can also be used to set a preferred vibration setting. Upon receiving a command to play a vibration sequence the controller 420 controls the driver 428 to cause the motor to spin or otherwise generate vibrations in accordance with the selected vibration sequence.

Figure 5:
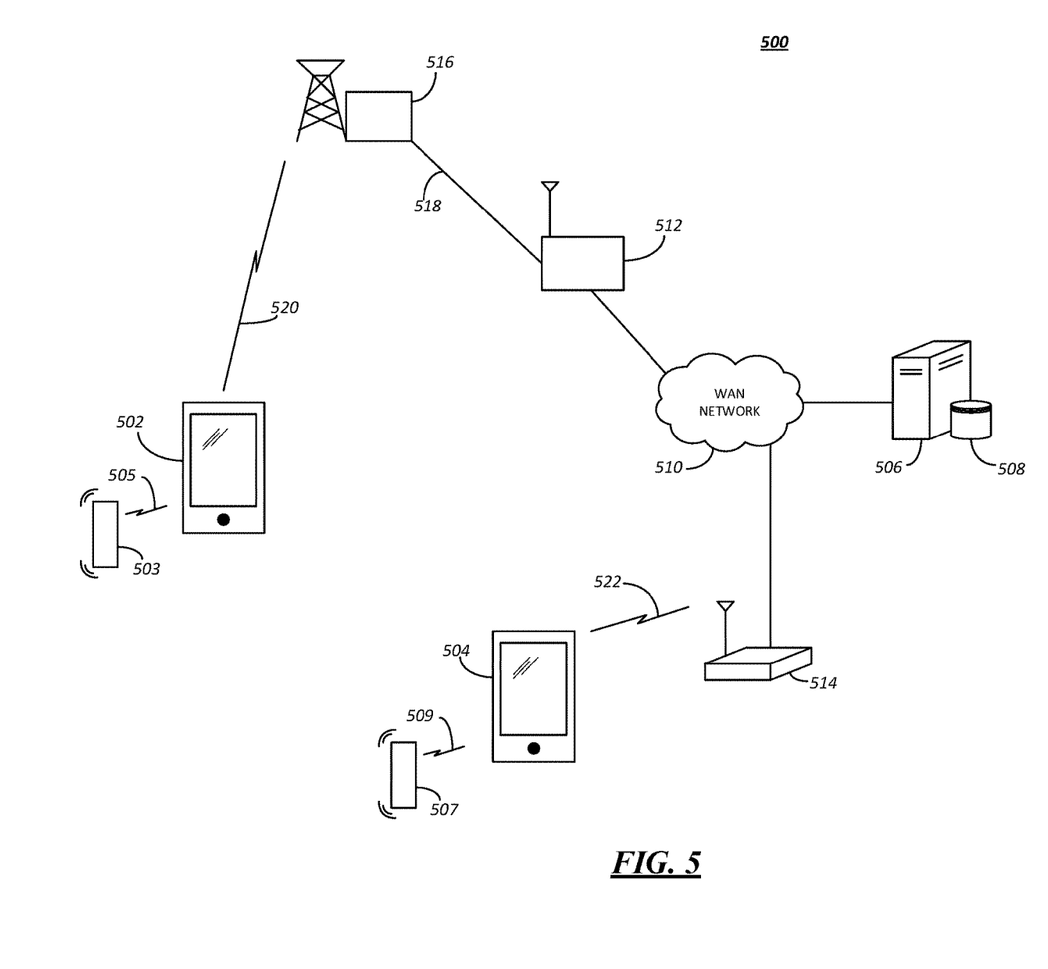
FIG. 5 is a system diagram of a monitoring system for monitoring and evaluating exposure time and levels for sound and vibration, in accordance with some embodiments.

FIG. 5 shows a monitoring system 500 for monitoring sound pressure and vibration level of users associated with the system 500. Each user can have a mobile communication device such as one of mobile communication devices 502, 504, and each mobile communication device is linked with an associated vibration accessory 503, 507, respectively, also carried by the users of the associated mobile communication devices 502, 504. The links 505, 509 can be facilitated using PAN transceivers in both the mobile communication devices 502, 504 and their associated vibration accessories 503, 507.

The mobile communication devices 502, 504 can communicate with a backed system including a backend server 506 via, for example, a wireless local area network, or a cellular telephony system, through a network 510. The backend server 506 is coupled to a database 508 in which records of users' sound levels and vibration levels can be stored, as well as time exceeding various occupational thresholds for those parameters. Once the exposure time of a given user reaches a maximum allowed exposure time, as dictated by the applicable occupational standard, the backend server 506 can alert the user, the user's supervisor, and others, by transmitting an appropriate alert message to devices associated with those people in the same location.

To communicate with mobile communication devices 502, 504, the backend server is coupled to a network 510, which facilitates communication with a cellular communication center 512, which can be further connected to a cellular base site 516 via a line 518. The base site 516 can transmit messages over a wireless cellular air interface 520 to mobile communication devices such as mobile communication device 502. Using a cellular telephony infrastructure allows a wide area of deployment for the users of mobile communication devices 502, 504 associated with the backed server 506. A more local approach can use wireless local area networks. For example, the server can communicate with mobile communication device 504 via a wireless link 522 to WiFi access point 514. The access point 514 establishes a wireless network in the vicinity of the access point 514 using a local area network air interface such as, for example, that specified by standard 802.11 of the IEEE.

In general, the backend server 506 allows supervision of deployed personnel regarding their exposure to significant levels of sound and vibration. The information collected at the backend server 506 can be made available locally to the server 506 (i.e. at a central administration facility) and it can be made available to remotely located supervisory personnel as well. By monitoring personnel exposure, the likelihood of imminent injury or other harm, as well as the possibility of long term effects, can be greatly reduced if not avoided. Additionally, by monitoring the ambient conditions at each mobile communication device 502, 504, each mobile communication device 502, 504 can adjust its audio output and vibration amplitude settings in order to increase the likelihood that the user of the mobile communication device 502, 504 will perceive alerts by the mobile communication device 502, 504. The alerts can be in response to receiving messages from other entities, or due to determinations made by the mobile communication device regarding the ambient conditions and exposure times, as well as other conventional alerting functions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations. The are to be construed to only include patent eligible subject matter.

We claim:

1. A method of alerting a user of a mobile communication device, comprising:
   measuring, by the mobile device, a first audio level of ambient sound at a location of the mobile device;
   determining whether the first audio level of ambient sound is higher than a present speaker volume setting of a speaker controlled by the mobile device for outputting audio to be heard by a user of the mobile device;
   when the first audio level of ambient sound exceeds the present speaker volume setting by a preselected threshold, the mobile device increasing the speaker volume setting by a preselected amount;
   determining whether speaker volume setting is at a maximum; and
   when the speaker volume setting is at the maximum, controlling a vibration of a vibration accessory controlled by the mobile device to vibrate to indicate that the speaker volume is at the maximum.

2. The method of claim 1, wherein, when the speaker volume setting is at the maximum, determining whether a noise cancellation function of the mobile device is active, and when the noise cancellation function is active, then enabling the vibration system.

3. The method of claim 1, wherein when the speaker volume setting is at the maximum, the mobile device playing an audio alert.

4. The method of claim 1, further comprising:
   receiving, at the mobile communication device, a message;
   determining whether the message is a request for an ambient noise level measurement from a backend system with which the mobile communication device is associated; and
   when the message is a request for an ambient noise level, the mobile communication device sending the first audio level to the backend system.

5. The method of claim 4, wherein the present audio level is converted to decibels prior to sending.

6. The method of claim 1, further comprising:
   further monitoring the ambient audio level by the mobile communication device; and
   when a second, ambient audio level measured subsequent to the first ambient audio level is lower than the first ambient audio level by a preselected threshold, lowering the present audio setting by a preselected amount.

* * * * *